US012763002B2

(12) United States Patent
Zeng et al.

(10) Patent No.: US 12,763,002 B2
(45) Date of Patent: Oct. 13, 2026

(54) DISPLAY PANEL AND DISPLAY DEVICE

(71) Applicants: Hefei Visionox Technology Co., Ltd., Hefei (CN); Visionox Technology Inc., Kunshan (CN)

(72) Inventors: Wenyu Zeng, Hefei (CN); Feng Chen, Kunshan (CN)

(73) Assignees: Hefei Visionox Technology Co., Ltd., Hefei (CN); Visionox Technology Inc., Kunshan (CN)

( * ) Notice: Subject to any disclaimer, the term of this patent is extended or adjusted under 35 U.S.C. 154(b) by 0 days.

(21) Appl. No.: 19/006,189

(22) Filed: Dec. 30, 2024

(65) Prior Publication Data

US 2025/0131874 A1 Apr. 24, 2025

(30) Foreign Application Priority Data

Jan. 31, 2024 (CN) ........................ 202410141857.9

(51) Int. Cl.
*G09G 3/32* (2016.01)

(52) U.S. Cl.
CPC ....... *G09G 3/32* (2013.01); *G09G 2310/0297* (2013.01); *G09G 2310/08* (2013.01); *G09G 2320/0247* (2013.01); *G09G 2330/021* (2013.01)

(58) Field of Classification Search
None
See application file for complete search history.

(56) References Cited

U.S. PATENT DOCUMENTS 11,538,412 B1 12/2022 Zhang
2017/0309230 A1* 10/2017 Kwon ................. G09G 3/3275
2021/0383743 A1 12/2021 Yuan
2021/0407383 A1 12/2021 Lai et al.
2022/0059030 A1* 2/2022 Sang .................... G09G 3/3233
2022/0101785 A1* 3/2022 Chung ................. G09G 3/3208
(Continued)

FOREIGN PATENT DOCUMENTS

CN 115083344 A 9/2022
CN 115547236 A 12/2022

OTHER PUBLICATIONS

The first office action and search report issued in Chinese corresponding application 202410141857.9, mailed on May 19, 2026.

*Primary Examiner* — Andre L Matthews
(74) *Attorney, Agent, or Firm* — Kilpatrick Townsend & Stockton LLP

(57) ABSTRACT

The present application provides a display panel, including a demultiplexer circuit and a plurality of driving modules, where the demultiplexer circuit includes at least one select line group and a plurality of switching elements, the select line group including a plurality of select lines, and a plurality of select lines of the at least one select line group being respectively connected to corresponding driving modules through the switching elements; one frame of image of the display panel includes a plurality of hold frames; the select line is configured to receive a first pulse in the hold frame, and during the duration of the first pulse, a switching element connected to the select line conducts to cause the corresponding driving module to receive a bias voltage; and the duration of the first pulse received by at least one of the select lines covers a plurality of the hold frames.

19 Claims, 6 Drawing Sheets

(56) References Cited

U.S. PATENT DOCUMENTS

| | | | | |
|---|---|---|---|---|
| 2022/0199035 | A1* | 6/2022 | Choi | G09G 3/3275 |
| 2023/0306906 | A1* | 9/2023 | Yang | G09G 3/3233 |
| 2024/0013694 | A1* | 1/2024 | Wang | G09G 3/2003 |
| 2024/0013709 | A1* | 1/2024 | Lee | G09G 3/3233 |
| 2024/0105104 | A1* | 3/2024 | Park | G09G 3/3266 |
| 2024/0169875 | A1* | 5/2024 | Yim | G09G 3/32 |
| 2024/0169914 | A1* | 5/2024 | Yamazaki | H10D 30/67 |
| 2024/0331618 | A1* | 10/2024 | Son | G09G 3/3233 |

* cited by examiner

DISPLAY PANEL AND DISPLAY DEVICE

CROSS-REFERENCE TO RELATED APPLICATION

This application claims priority to Chinese Patent Application No. 202410141857.9, entitled “DISPLAY PANEL AND DISPLAY DEVICE,” filed on Jan. 31, 2024, the content of which is hereby incorporated herein in its entirety by reference.

TECHNICAL FIELD

The present application relates to the field of display technologies, and in particular, to a display panel and a display device.

BACKGROUND OF THE INVENTION

With the development of display technologies, display panels are more and more widely used in people’s production and daily life. Accordingly, people’s requirements for display panels are becoming increasingly high. How to reduce the power consumption of display panels has always been a subject of significant attention.

SUMMARY OF THE INVENTION

In view of this, the present application is dedicated to providing a display panel and a display device, which can effectively reduce signal interference and improve touch performance.

In a first aspect, the present application provides a display panel. The display panel includes: a demultiplexer circuit and a plurality of driving modules, where the demultiplexer circuit includes at least one select line group and a plurality of switching elements, the select line group including a plurality of select lines, and a plurality of select lines of the at least one select line group being respectively connected to corresponding driving modules through the switching elements;

one frame of image of the display panel includes a plurality of hold frames;

the select line is configured to receive a first pulse in the hold frame, and during the duration of the first pulse, a switching element connected to the select line conducts to cause the corresponding driving module to receive a bias voltage; and the duration of the first pulse received by at least one of the select lines in the select line group covers a plurality of the hold frames.

Optionally, the duration of the first pulse received by all of the select lines in the select line group covers a plurality of the hold frames; and preferably, the duration of the first pulse received by all of the select lines covers all of the hold frames.

Optionally, the select line group includes a first type of select line and a second type of select line; and the first pulse includes a first type of pulse and a second type of pulse;

the first type of select line receives at least the first type of pulse in the plurality of hold frames, and the second type of select line receives the second type of pulse in each of the plurality of hold frames;

the duration of the first type of pulse covers a plurality of the hold frames;

the duration of the second type of pulse is less than the duration of one of the hold frames;

preferably, the duration of the first type of pulse covers all of the hold frames;

preferably, the first type of select line further receives the second type of pulse in the plurality of hold frames; and preferably, the select line group further includes a third type of select line; the first pulse further includes a third type of pulse; the third type of select line receives the third type of pulse in the plurality of hold frames; and the duration of the third type of pulse covers all of the hold frames.

Optionally, the display panel further includes a plurality of light-emitting pixels, where a plurality of select lines of the at least one select line group are respectively connected to corresponding light-emitting pixels through the switching elements and the driving modules; and preferably, a first terminal of the switching element is connected to a DDIC data line, and a second terminal of the switching element is connected to a data write terminal of the driving module.

Optionally, the bias voltage includes a first type of bias voltage and a second type of bias voltage, a voltage value of the first type of bias voltage being different from a voltage value of the second type of bias voltage.

Optionally, the light-emitting pixels include a first color light-emitting pixel;

the second type of select line is connected to the corresponding first color light-emitting pixel through the switching element and the driving module;

during the duration of the second type of pulse, the switching element connected to the second type of select line conducts to cause the corresponding driving module to receive the first type of bias voltage;

preferably, the voltage value of the first type of bias voltage is less than the voltage value of the second type of bias voltage; and the first color light-emitting pixel includes a blue light-emitting pixel;

or the voltage value of the first type of bias voltage is greater than the voltage value of the second type of bias voltage; and the first color light-emitting pixel includes a green light-emitting pixel.

Optionally, the bias voltage further includes a third type of bias voltage; and the voltage value of the first type of bias voltage, the voltage value of the second type of bias voltage, and a voltage value of the third type of bias voltage are different from each other.

Optionally, the light-emitting pixels include a first color light-emitting pixel, a second color light-emitting pixel, and a third color light-emitting pixel;

during the duration of the second type of pulse, the switching element connected to the second type of select line conducts to cause the driving module corresponding to the first color light-emitting pixel to receive the first type of bias voltage and the driving module corresponding to the second color light-emitting pixel to receive the second type of bias voltage; or cause the driving module corresponding to the first color light-emitting pixel to receive the first type of bias voltage and the driving module corresponding to the third color light-emitting pixel to receive the third type of bias voltage; or cause the driving module corresponding to the second color light-emitting pixel to receive the second type of bias voltage and the driving module corresponding to the third color light-emitting pixel to receive the third type of bias voltage; and preferably, the voltage value of the first type of bias voltage is less than the voltage value of the second type of bias voltage; the voltage value of the second type of bias voltage is less than the voltage value of the third type of bias voltage; the first color light-emitting pixel includes a blue light-emitting pixel; the second color light-emitting pixel includes a red light-emitting pixel; and the third color light-emitting pixel includes a green light-emitting pixel.

Optionally, a number of select lines in the select line group is greater than or equal to 2 and less than or equal to 12;

preferably, numbers of select lines in all of the select line groups are the same;

preferably, a number of select lines in the select line group is N, N being a multiple of 3; and the light-emitting pixels comprise a first color light-emitting pixel, a second color light-emitting pixel, and a third color light-emitting pixel;

preferably, a number of driving modules connected to the first color light-emitting pixel is N/3;

a number of driving modules connected to the second color light-emitting pixel is N/3; and a number of driving modules connected to the third color light-emitting pixel is N/3; and preferably, the first color light-emitting pixel includes a blue light-emitting pixel; the second color light-emitting pixel includes a red light-emitting pixel; and the third color light-emitting pixel includes a green light-emitting pixel.

Optionally, the select line group includes a first color select line, a second color select line, and a third color select line, where the first color select line is connected to the corresponding first color light-emitting pixel through the switching element and the driving module; the second color select line is connected to the corresponding second color light-emitting pixel through the switching element and the driving module; and the third color select line is connected to the corresponding third color light-emitting pixel through the switching element and the driving module; and preferably, the first color select line, the second color select line, and the third color select line are alternately arranged in sequence.

Optionally, voltage values of bias voltages received by the driving modules in the plurality of hold frames are the same and remain constant;

preferably, the one frame of image of the display panel further includes a data write frame;

select lines in the at least one select line group are configured to receive a second pulse in a time-division manner in the data write frame, and during the duration of the second pulse, switching elements connected to the select lines conduct to cause the corresponding driving modules to receive a data write voltage;

preferably, in the one frame of image, the number of the data write frames is 1, and the number of the hold frames is 59;

or in the one frame of image, the number of the data write frames is 1, and the number of the hold frames is 3;

or in the one frame of image, the number of the data write frames is 1, and the number of the hold frames is 2.

Optionally, the select lines in the at least one select line group receive the first pulse in a time-division manner in the hold frames.

In a second aspect, an embodiment of the present application further provides a display device, including the display panel according to the first aspect of the present application.

In the solution of the present application, the display panel includes a demultiplexer circuit and a plurality of driving modules, where the demultiplexer circuit includes at least one select line group and a plurality of switches, the select line group including a plurality of select lines, and a plurality of select lines of the at least one select line group being respectively connected to the corresponding driving modules through the switching elements; one frame of image of the display panel includes a plurality of hold frames; the select line is configured to receive a first pulse in the hold frame, and during the duration of the first pulse, a switching element connected to the select line conducts to cause the corresponding driving module to receive a bias voltage, so as to mitigate the bias problem, where the duration of the first pulse received by at least one of the select lines in the select line group covers a plurality of the hold frames. In this way, while ensuring the mitigation of the problem of low-frequency flicker, by setting the duration of the first pulse received by the at least one select line to cover a plurality of the hold frames, the number of pulses received by the demultiplexer circuit in all of the hold frame phases can be greatly reduced, thereby decreasing the action of the clock signal and lowering the power consumption of the display panel.

BRIEF DESCRIPTION OF DRAWINGS

By providing a more detailed description of the embodiments of the present application in conjunction with the accompanying drawings, the above and other objectives, features, and advantages of the present application will become more apparent. The accompanying drawings are intended to provide further understanding of the embodiments of the present application and constitute a part of the specification, and, together with the embodiments of the present application, are used to explain the present application without constituting a limitation of the present application. In the accompanying drawings, the same reference numerals generally represent the same components or steps.

DETAILED DESCRIPTION OF THE INVENTION

Unless otherwise defined, the technical or scientific terms used in the embodiments of the specification shall have the common meanings as understood by those of ordinary skill in the art to which the specification belongs. "First", "second", and like words used in the embodiments of the specification do not indicate any order, quantity, or importance, but are merely employed to avoid confusion among constituent elements.

Unless the context requires otherwise, throughout the specification, "a plurality of" means "at least two", and "comprising/including" is to be interpreted as an open, inclusive meaning, that is, "including, but not limited to". In the description of the specification, "one embodiment", "some embodiments", "exemplary embodiment", "example", "specific example", or "some examples" and other terms are intended to indicate that specific features, structures, materials, or characteristics associated with the embodiment or example are included in at least one embodiment or example of the specification. The schematic expressions of the above terms do not necessarily refer to the same embodiments or examples.

The technical solutions in the embodiments of the specification will be clearly and completely described below in conjunction with the accompanying drawings in the embodiments of the specification. Apparently, the embodiments described are merely some rather than all of the embodiments of the specification. All other embodiments derived by those of ordinary skill in the art on the basis of the embodiments in the specification without creative efforts are within the scope of protection of the specification.

At present, in order to reduce the overall power consumption, there is a growing demand for low-frequency display. Low-temperature polycrystalline oxide (LTPO) transistors have become the mainstream solution for low-frequency display due to their low current leakage.

Taking 1 Hz timing as an example, a 1 Hz timing solution is implemented in the form of 60 Hz frame skip, that is, sharing 60 Hz timing, and only emitting light without performing data write operations during a hold frame phase. In addition, during the hold frame phase, in order to improve the bias of a driving transistor, a bias voltage is applied through a data line to act on the source of the driving transistor to mitigate the problem of voltage bias. Moreover, in order to reduce wiring arrangements, a display panel further incorporates a demultiplexer circuit (demux). The demultiplexer circuit, also known as a data distribution circuit, is a circuit that switches a signal on a common input line to one of several separate output lines. The data distribution function of the demultiplexer circuit can greatly reduce the number of wiring arrangements in the bezel, so as to meet the requirement for the narrow bezel of the display panel while meeting the data transmission requirement of a large number of display pixels.

Figure 1:
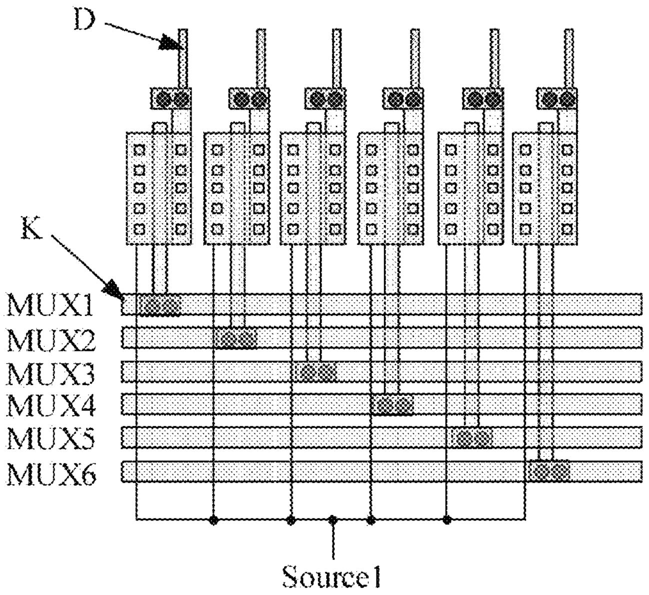
FIG. 1 is a schematic diagram of a structure of a demultiplexer circuit according to the prior art.
Figure 2:
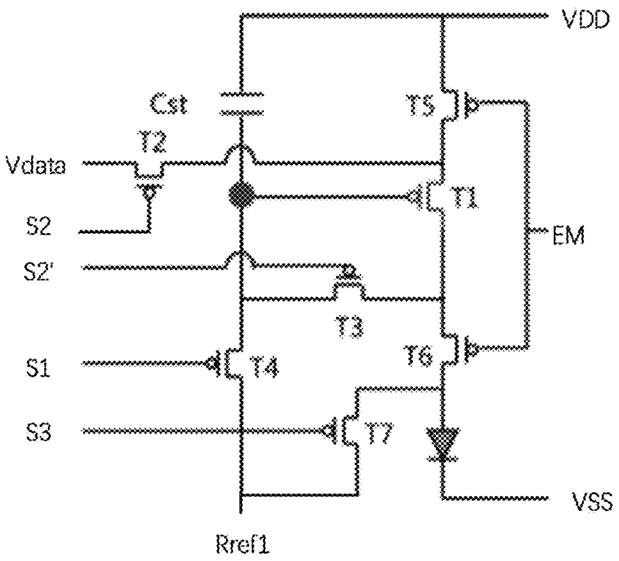
FIG. 2 is a schematic diagram of a structure of a conventional driving circuit according to the prior art.

Referring to FIG. 1. FIG. 1 shows a demultiplexer circuit of channels 1 to 6 (or 1/6). The circuit includes 6 select lines (Mux1 to Mux6) and a plurality of switching elements K. Source1 output by a control chip (IC) may be connected to 6 data lines D within a display area, and the 6 data lines D are respectively connected to different light-emitting pixels through corresponding driving modules. The driving module includes a driving circuit. FIG. 2 shows a circuit diagram of a conventional driving circuit. The conventional driving circuit is a 7T1C (7 transistors and 1 capacitor) circuit, where T1 is a driving transistor, and T3 and T4 are indium gallium zinc oxide (IGZO) transistors, and an output terminal of the data line D in FIG. 1 is connected to a Vdata terminal in a corresponding driving module.

Figure 3:
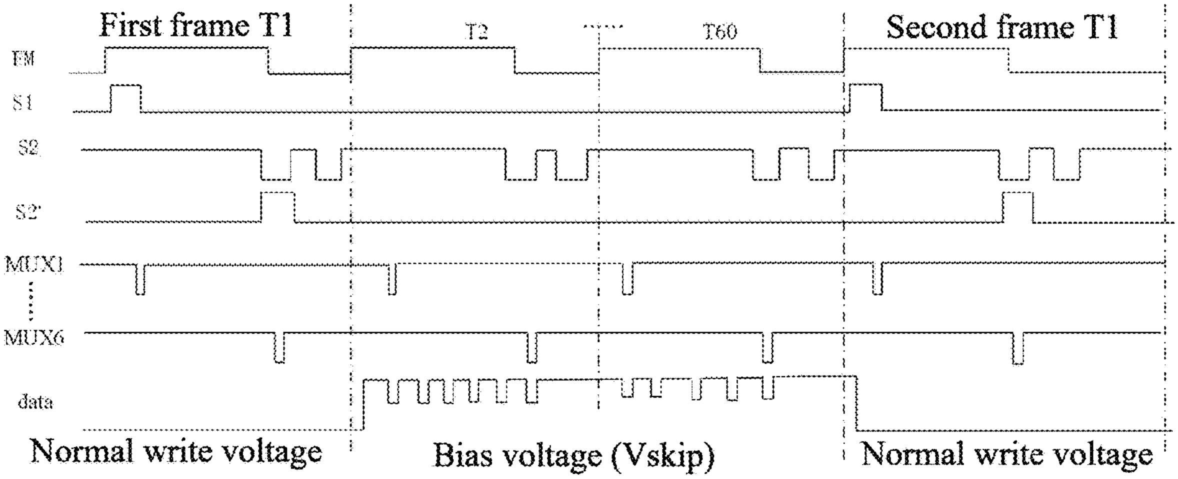
FIG. 3 is a timing diagram corresponding to the circuits shown in FIG. 1 and FIG. 2.

A timing diagram corresponding to FIG. 1 and FIG. 2 is as shown in FIG. 3. Through research, the inventors have found that only when Mux switching signals (Mux1 to Mux6 in the figure) are set to low, the source1 line can sequentially write a normal write voltage/bias voltage (Vskip) into the 6 data lines D in the display area. During the scanning of each row, the select line Mux is set to low. The last scan line must be set to low before a charging action (S2') is completed, or it can be set to low before the charging action starts, so as to avoid abnormal display. Taking a display panel with a display resolution of 466*466 as an example, for one subframe (1/60 s), D_Mux1 to D_Mux6 will be set to low 466 times, resulting in 466 pulses. There are 60 subframes in one frame of image; that is, within 1 s, Mux1 to Mux6 will result in 60*466 pulses. The more oscillations there are, the more clock signals are required, resulting in greater power consumption.

In view of this, the present application provides a solution that can effectively reduce the power consumption of the display panel. During a plurality of hold frames, in response to a first pulse, a bias voltage is supplied to a plurality of driving modules to mitigate the problem of voltage bias, thereby ensuring the light-emitting effect of the display panel. In addition, by adjusting the duration of the first pulse, the duration of at least one type of first pulse in the demultiplexer circuit covers a plurality of hold frames, which can greatly reduce the number of first pulses received by the demultiplexer circuit in all of the hold frame phases, thereby reducing the number of clock signals, for reducing the power consumption of the display panel.

Figure 4:
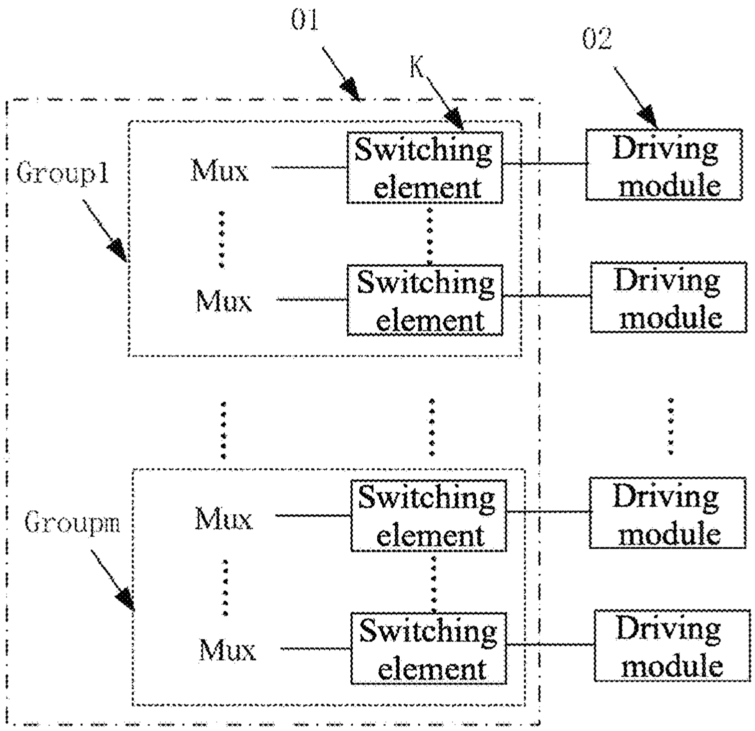
FIG. 4 is a schematic diagram of a structure of a display panel according to an embodiment of the present application.

Specifically, as an optional implementation of the disclosure of the present application, an embodiment of the present application provides a display panel. FIG. 4 is a schematic diagram of a structure of a display panel according to an embodiment of the present application. As shown in FIG. 4, the display panel may include at least: a demultiplexer circuit 01 and a plurality of driving modules 02.

The demultiplexer circuit 01 may include m select line groups Group and a plurality of switching elements K, where m is a positive integer greater than or equal to 1. The select line group Group includes a plurality of select lines. Select lines Mux in the select line group Group are respectively connected to the corresponding driving modules 02 through the switching elements K.

Figure 5:
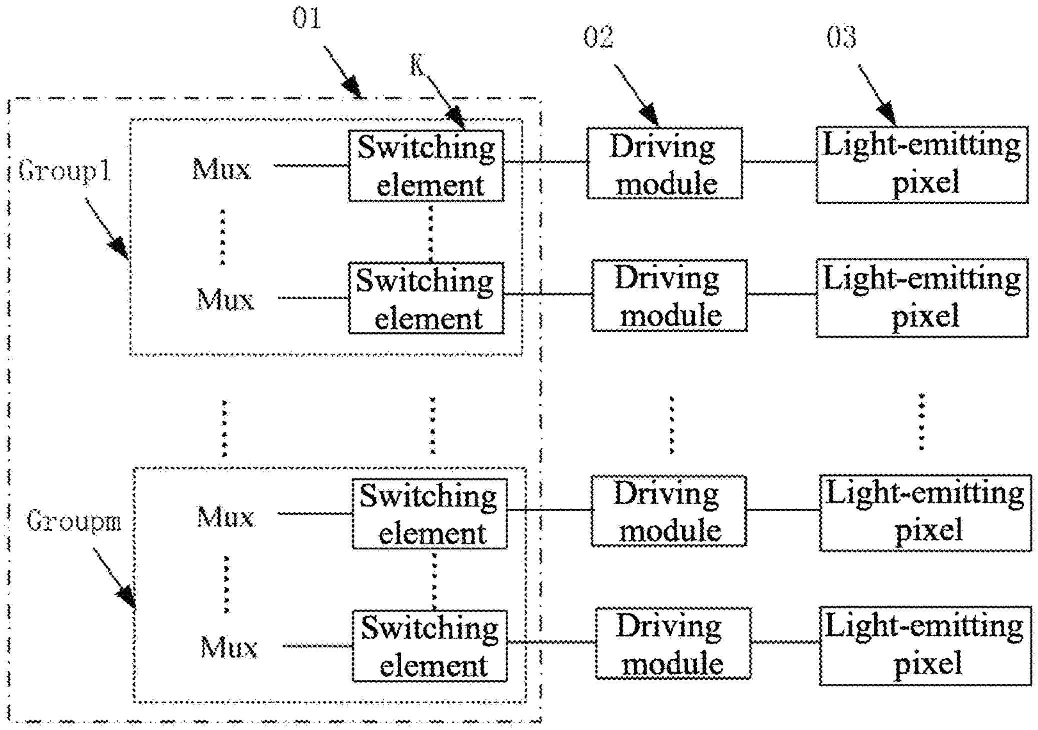
FIG. 5 is a schematic diagram of a structure of a display panel according to another embodiment of the present application.

In some embodiments, as shown in FIG. 5, the display panel may further include a plurality of light-emitting pixels 03. The select lines Mux in the m select line groups Group are respectively connected to the corresponding light-emitting pixels 03 through the switching elements K and the driving modules 02.

Figure 6:
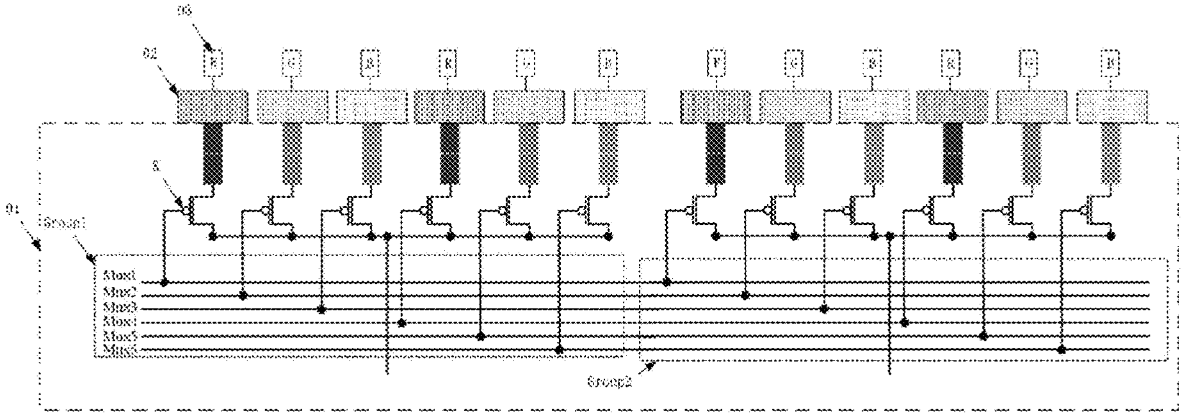
FIG. 6 is a schematic diagram of a structure of a display panel according to another embodiment of the present application.

Taking an example where there are 2 select line groups, with each select line group having 6 select lines, as shown in FIG. 6, the display panel includes a select line group Group1 and a select line group Group2. The 6 select lines of the select line group Group1 are Mux1, Mux2, Mux3, Mux4, Mux5 and Mux6. Mux1, Mux2, Mux3, Mux4, Mux5, and Mux6 are connected through the switching elements K to the corresponding driving modules and light-emitting pixels of different light-emitting colors (red light-emitting pixels R for emitting red light, green light-emitting pixels G for emitting green light, and blue light-emitting pixels B for emitting blue light). Among them, the select lines Mux1 and Mux4 are connected to the same light-emitting pixels R, the select lines Mux2 and Mux5 are connected to the light-emitting pixels G of the same color, and the select lines Mux3 and Mux6 are connected to the light-emitting pixels B of the same color.

It should be noted that in the embodiments of the present application, the grouping of the select lines is performed based on their electrical connection to light-emitting pixels of different colors, and no physical changes to the select lines in the same select line group in the display panel are required.

One frame of image of the display panel may include a plurality of hold frames.

Specifically, the select line in the m select line groups Group is configured to receive a first pulse in the hold frames, and during the duration of the first pulse, a switching element connected to the select line conducts to cause the corresponding driving module to receive a bias voltage.

When receiving the first pulse in the hold frames, the select lines in the m select line groups Group may receive the first pulse in a time-division manner.

During implementation, the switching elements K may include a thin film transistor. That is, a first terminal of the switching element K is a first terminal of the thin film transistor and a second terminal of the switching element K is a second terminal of the thin film transistor, and the first terminal of the switching element K is connected to a DDIC data line and the second terminal of the switching element K is connected to a data write terminal of the driving module 02. Specifically, a control terminal of the thin film transistor is connected to the select line, the first terminal of the thin film transistor is connected to the DDIC data line (Source1), and the second terminal is connected to the data write terminal of the driving module 02, and the control terminal of the thin film transistor is configured to control the conduction between the first terminal and the second terminal. In an embodiment of the present application, when the control terminal of the thin film transistor receives the first pulse, the thin film transistor is in a conducting state. That is, during the duration of the first pulse received by a select line Mux in the select line group Group, the bias voltage provided by the Source1 is written to the data write terminal of the driving module through the thin film transistor that has received the first pulse, for the purpose of voltage bias improvement.

The duration of the first pulse received by at least one of the select lines in the select line group covers a plurality of the hold frames. That is, there is at least one select line in the select line group that only receives the first pulse once in a plurality of consecutive hold frame phases. Compared with the conventional method in which each hold frame contains a first pulse, the total number of first pulses received in all of the hold frame phases is significantly reduced, thereby reducing the power consumption.

In some embodiments, the one frame of image of the display panel may further include a data write frame.

Correspondingly, select lines in the m select line groups Group may also be configured to receive a second pulse in a time-division manner in the data write frame, and during the duration of the second pulse, switching elements connected to the select lines conduct to cause the corresponding driving modules to receive a data write voltage.

Specifically, if the switching element K is a thin film transistor, during the duration of the second pulse received by a select line Mux in the select line group Group, a data write voltage provided by the Source1 is written to the data write terminal of the driving module through the thin film transistor that has received the second pulse, so as to complete a data write operation. In this way, by responding to the second pulse through the demultiplexer circuit 01 during the data write frame, the data write voltage is provided to the corresponding plurality of driving modules 02 to cause the driving modules 02 to drive the corresponding light-emitting pixels 03 to emit light.

Figure 7:
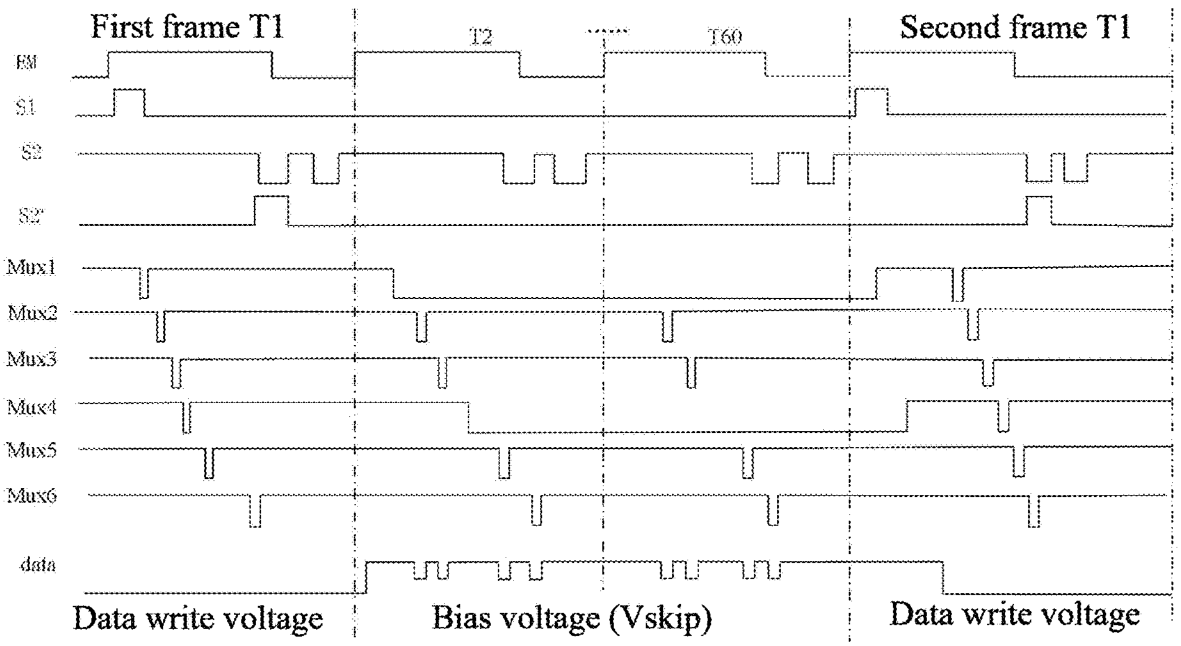
FIG. 7 is a timing diagram according to an embodiment of the present application.

FIG. 7 is a timing diagram corresponding to the display panel shown in FIG. 6, where the driving circuit of the driving module is a conventional 7T1C circuit (as shown in FIG. 2). One frame of image includes a data write frame T1 and a plurality of hold frames (T2 to T60). In the T1 phase, the select lines Mux1 to Mux6 receive the second pulse in sequence, causing the data write voltage to be written into the driving circuit. In the T2 to T60 phases, the corresponding select lines Mux1 and Mux4 that are connected to the light-emitting pixels of the same light-emitting color each receive the first pulse only once, and the duration of the first pulse covers the T2 to T60 phases; the select lines Mux2, Mux3, Mux5, and Mux6 maintain the original pulse receiving frequency. In addition, the voltage value of the bias voltage is also adaptively adjusted based on the improvement requirements of the driving circuits. In this way, while the display effect is improved, the number of times that the select lines Mux1 and Mux4 receive the first pulse within 1*s* is significantly reduced, thereby reducing the power consumption of the display panel.

Figure 8:
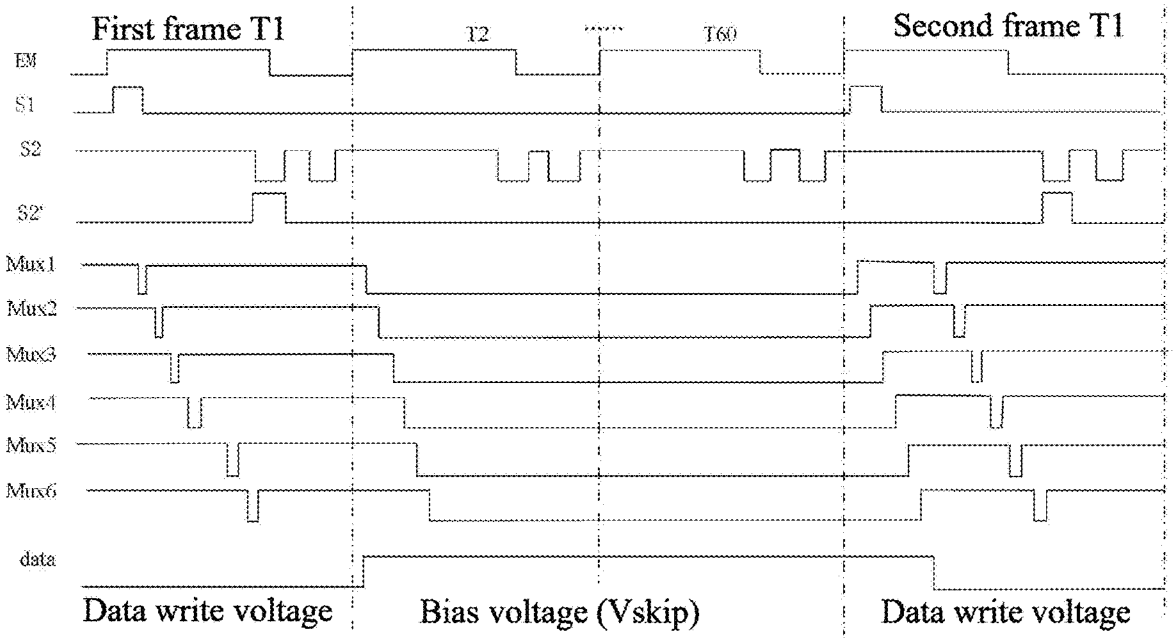
FIG. 8 is a timing diagram according to another embodiment of the present application.

FIG. 8 is also a timing diagram corresponding to the display panel shown in FIG. 6, where the driving circuit of the driving module is also a conventional 7T1C circuit. In the T1 phase, the select lines Mux1 to Mux6 receive the second pulse in sequence, causing the data write voltage to be written into the driving circuit. In the T2 to T60 phases, the select lines Mux1 to Mux6 are all set to low, and the bias voltage Vskip remains constant, which means that the voltage values of the bias voltages received by the driving modules are the same. At this time, for all driving modules, the bias voltage is simultaneously written into the sources of the driving transistors T1 for bias improvement. Additionally, since S2' is always set to low throughout the hold frames, the bias voltage Vskip is not written into the gate of the driving transistor T1, thereby preventing the abnormal display. In this way, the total number of first pulses received by the select lines can be further reduced, and accordingly, the power consumption of the display panel can be further reduced.

It should be noted that, for different select lines, the spacing between the rising edge of a pulse signal received in the T1 phase and the falling edge of a pulse signal received in the T2 phase may be the same or different. That is, the time interval between receiving the second pulse in the T1 phase and receiving the first pulse in the T2 phase may be the same or different.

Figure 9:
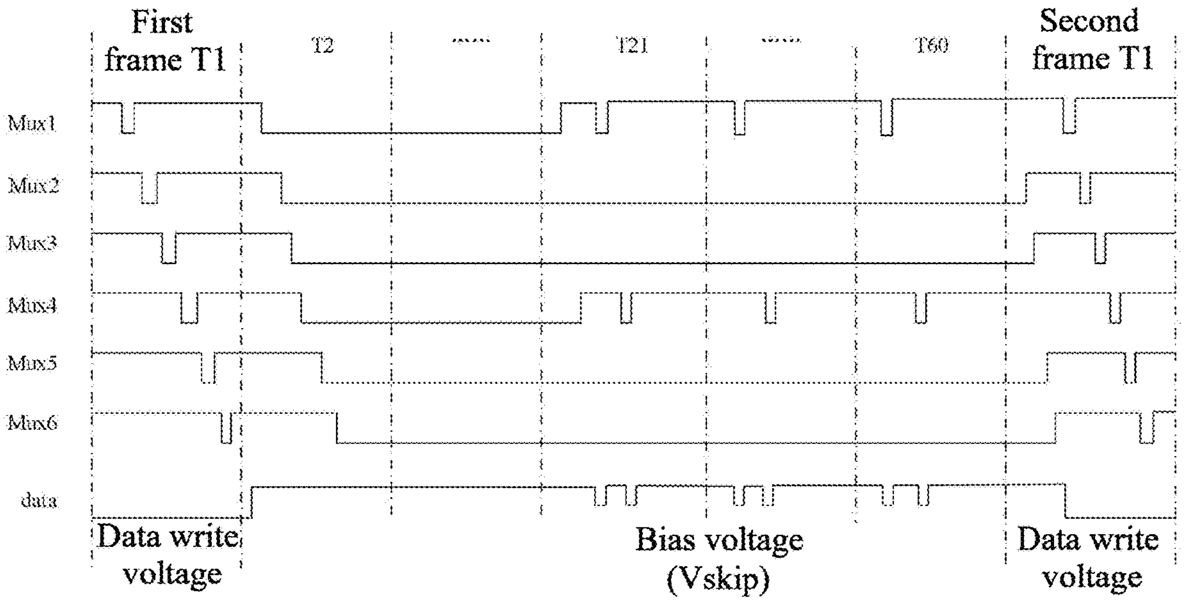
FIG. 9 is a timing diagram according to another embodiment of the present application.

Certainly, FIG. 7 merely illustrates an example in which the duration of the first pulse received by the select lines Mux1 and Mux4 (select lines connected to the same light-emitting color) covers all of the hold frames. However, the present application is not limited thereto. In some other embodiments, the duration of the first pulse received by the select lines Mux1 and Mux4 may not completely cover all of the hold frames. For example, as shown in FIG. 9, the duration of the first pulse received by the select lines Mux1 and Mux4 covers T2 to T20, while in the remaining T21 to T60 phases, the select lines Mux1 and Mux4 may resume the original frequency of receiving the first pulse (the first pulse is received once per hold frame, with the duration of the first pulse being less than the duration of one of the hold frames).

In addition, it should be noted that all of the select lines in the demultiplexer circuit 01 receiving the second pulse in the data write frame in a time-division manner and receiving the first pulse in the hold frames in a time-division manner is to avoid the situation where there are at least two of the switching elements receiving the second pulse or the first pulse simultaneously, thereby avoiding data crosstalk caused by the simultaneous conduction of the switching elements.

In some embodiments, the duration of the first pulse received by all of the select lines in the select line groups Group covers a plurality of hold frames.

Comparing the case where the duration of the first pulse received by all of the select lines covers a plurality of hold frames to the case where the duration of the first pulse received by part of the selection lines covers the plurality of hold frames, when the condition of the plurality of hold frames covered by the duration is the same, it can further reduce the total number of pulses in the case where the duration of the first pulse received by all of the select lines covers a plurality of hold frames, thereby reducing the power consumption of the display panel.

Certainly, the present application is not limited thereto, and in some other embodiments, the duration of the first pulse received by all of the select lines may cover all of the hold frames.

Compared to the case where the duration of the first pulse covers not all of the hold frames, if the duration of the first pulses covers all of the hold frames, the total number of pulses can be further reduced, thereby further reducing the power consumption of the display panel.

In addition, considering that driving transistors in driving modules corresponding to the light-emitting pixels of different colors have different characteristics, the select lines may be divided in order to balance the reduction of power consumption and the effect of low-frequency flicker improvement. Specifically, in some embodiments, the select line group may include a first type of select line and a second type of select line; and the first pulse may include a first type of pulse and a second type of pulse.

The first type of select line receives at least the first type of pulse in the plurality of hold frames, and the second type of select line receives the second type of pulse in each of the plurality of hold frames; the duration of the first type of pulse covers a plurality of the hold frames; and the duration of the second type of pulse is less than the duration of one of the hold frames. During implementation, among the plurality of hold frames, the first type of select line may receive the first type of pulse in part of the hold frames, or may receive the first type of pulse in all of the hold frames. For example, in the timing control shown in FIG. 7, the select lines Mux1 and Mux4 are the first type of select line, and the first pulse received by them is the first type of pulse, and all of the first type of select lines receive the first type of pulse. The select lines Mux2, Mux3, Mux5, and Mux6 are the second type of select line, and the first pulse received by them is the second type of pulse.

In this way, by using the first type of select line to receive at least the first type of pulse in the plurality of hold frames, the number of the first type of pulses received throughout the entire hold frame phase can be effectively reduced, that is, the number of first pulses is reduced, thereby achieving the effect of reducing the power consumption.

On the one hand, when the first type of select line receives the first type of pulse in all of the hold frames, the duration of the first type of pulse may cover all of the hold frames. Compared to the case where the duration of the first type of pulse covers part of the hold frames, if the duration of the first type of pulse covers all of the hold frames, the total number of pulses can be further reduced, thereby reducing the power consumption of the display panel.

On the other hand, when the first type of select line receives the first type of pulse in part of the hold frames, the first type of select line may further receive the second type of pulse in the plurality of hold frames.

Specifically, when the first type of select line receives the first type of pulse in part of the plurality of hold frames, the first type of select line may receive the second type of pulse in the remaining part (the part in which the first type of pulse is not received) of the plurality of hold frames.

In some embodiments, the select line group may further include a third type of select line; and accordingly, the first pulse may further include a third type of pulse. The third type of select line receives the third type of pulse in the plurality of hold frames, and the duration of the third type of pulse covers all of the hold frames.

For the same select line, if the duration of the first pulse it receives covers all of the hold frames, it is clear that fewer first pulses are required than that in the case where the duration of the first pulse it receives covers part of the hold frames. That is, when the duration of the first pulse received by the select line covers all of the hold frames, a greater power consumption reduction can be achieved.

Thus, in some embodiments, in the select line group, the first type of select line may receive the first type of pulse in part of the hold frames among all of the hold frames, and receive the second type of pulse in the remaining part of the hold frames; the second type of select line may receive the second type of pulse; and the third type of select line may receive the third type of pulse. This can effectively reduce the number of pulses received in the entire hold frame phase while taking into account the display requirements, thereby achieving the effect of reducing the power consumption.

In addition, in order to balance the reduction of power consumption and the effect of low-frequency flicker improvement, the bias voltage may also be divided. Specifically, the bias voltage may include a first type of bias voltage and a second type of bias voltage, the first type of bias voltage and the second type of bias voltage having different voltage values.

Providing bias voltages with different voltage values for the driving modules corresponding to the light-emitting pixels of different light-emitting colors can enable the corresponding driving modules to better mitigate the problem of voltage bias based on the received bias voltages, thereby improving the display effect of the display panel more flexibly.

During implementation, the light-emitting pixels may include a first color light-emitting pixel. The second type of select line is connected to the corresponding first color light-emitting pixel through the switching element and the driving module. During the duration of the second type of select line, the switching element connected to the second type of select line conducts to cause the corresponding driving module to receive the first type of bias voltage, thereby achieving bias improvement for the first color light-emitting pixel.

During implementation, the voltage value of the first type of bias voltage may be less than the voltage value of the second type of bias voltage. Accordingly, the first color light-emitting pixel may include a blue light-emitting pixel. Alternatively, the voltage value of the first type of bias voltage may be greater than the voltage value of the second type of bias voltage. Accordingly, the first color light-emitting pixel may include a green light-emitting pixel.

As such, the bias voltages received by the driving modules corresponding to the light-emitting pixels of different light-emitting colors are adjusted, so that the display effect of the display panel can be improved while reducing the power consumption of the display panel.

It should be noted that the bias value of the bias voltage required by a driving module corresponding to the blue light-emitting pixel is lower than that required in the case of the conventional red light-emitting pixel and green light-emitting pixel. Therefore, the voltage value provided to the driving module corresponding to the blue light-emitting pixel is the first type of bias voltage, which is lower than the second type of bias voltage, thereby reducing the power consumption while taking into account the light-emitting effect of the blue light-emitting pixel. Similarly, appropriate bias voltages are respectively provided for the red light-emitting pixel and the green light-emitting pixel, thereby achieving the purpose of reducing the power consumption and improving the light-emitting effect.

Figure 10:
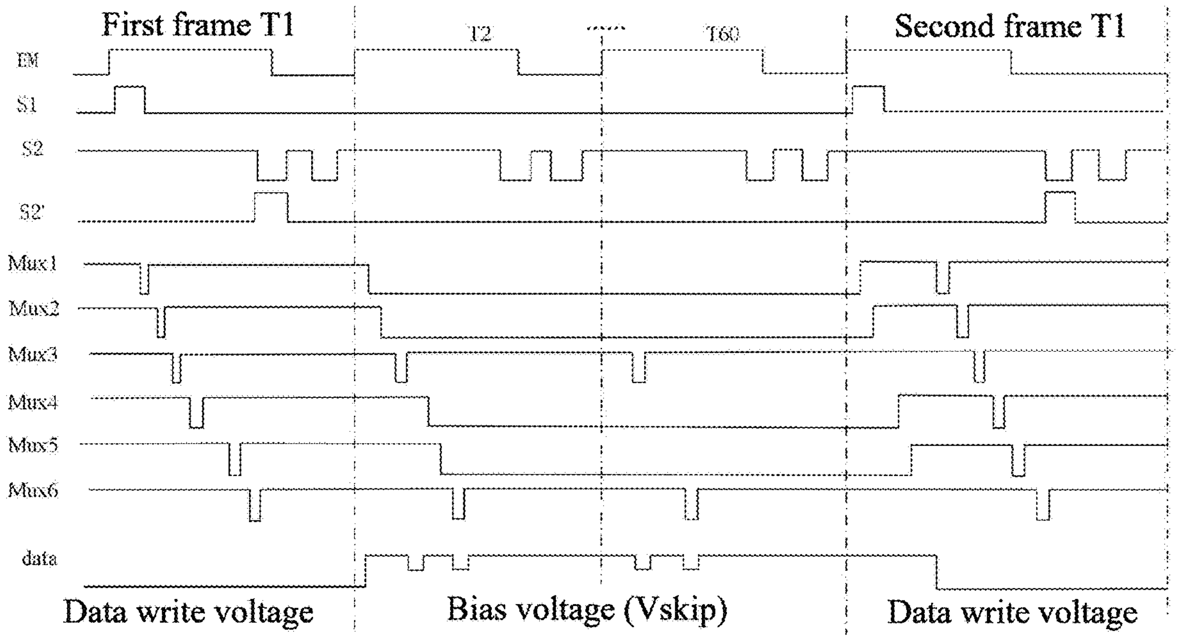
FIG. 10 is a timing diagram according to another embodiment of the present application.

As shown in FIG. 10, Mux1 and Mux4 are both connected to the corresponding driving modules and red light-emitting pixels R through the switching elements K, Mux2 and Mux5 are both connected to the corresponding driving modules and green light-emitting pixels through the switching elements K, and Mux3 and Mux6 are both connected to the corresponding driving modules and blue light-emitting pixels through the switching elements K. In the T1 phase, the select lines Mux1 to Mux6 receive the second pulse in sequence, so that the data write voltage is written into the driving circuit. In the T2 to T60 phases, the select lines Mux1, Mux2, Mux4, and Mux5 all receive the first type of pulse, and the duration of the first type of pulse covers the T2 to T60 phases, thereby achieving the effect of reducing the power consumption. Meanwhile, the select lines Mux3 and Mux6 receive the second type of pulse, and the voltage value of the bias voltage Vskip during the duration of the first type of pulse is greater than the voltage value of the bias voltage Vskip during the duration of the second type pulse. In this way, it can be ensured that the driving module corresponding to the blue light-emitting pixel can receive a lower bias voltage value, which not only effectively improves the light-emitting effect of the blue light-emitting pixel, but also reduces the power consumption of the display panel due to the existence of the first type of pulse.

In order to further improve the display effect of the display panel, in some embodiments, the bias voltage may further include a third type of bias voltage. The voltage value of the first type of bias voltage, the voltage value of the second type of bias voltage, and a voltage value of the third type of bias voltage are different from each other.

Specifically, the light-emitting pixels may include a first color light-emitting pixel, a second color light-emitting pixel, and a third color light-emitting pixel. During the duration of the first pulse, the switching element connected to the second type of select line conducts to cause the driving module corresponding to the first color light-emitting pixel to receive the first type of bias voltage and the driving module corresponding to the second color light-emitting pixel to receive the second type of bias voltage; or the driving module corresponding to the first color light-emitting pixel to receive the first type of bias voltage and the driving module corresponding to the third color light-emitting pixel to receive the third type of bias voltage; or the driving module corresponding to the second color light-emitting pixel to receive the second type of bias voltage and the driving module corresponding to the third color light-emitting pixel to receive the third type of bias voltage.

The voltage values of the first type of bias voltage, the second type of bias voltage, and the third type of bias voltage can be set based on the light-emitting colors of the corresponding light-emitting pixels.

As such, the bias voltages with different voltage values are set for the driving modules corresponding to the light-emitting pixels of different colors, so that the light-emitting effects of the color light-emitting pixels can be further improved, thereby further enhancing the display effect of the display panel.

During implementation, the voltage value of the first type of bias voltage is less than the voltage value of the second type of bias voltage, and the voltage value of the second type of bias voltage is less than the voltage value of the third type of bias voltage. The first color light-emitting pixel includes a blue light-emitting pixel, the second color light-emitting pixel includes a red light-emitting pixel, and the third color light-emitting pixel includes a green light-emitting pixel. A lower bias voltage is provided to a driving module with a lower bias voltage requirement, and a higher bias voltage is provided to a driving module with a higher bias voltage requirement, thereby optimizing the bias voltage supply and improving the light-emitting effects of the light-emitting pixels.

As mentioned above, in the display panel according to the embodiment of the present application, the plurality of select lines in the at least one select line group are respectively connected to the corresponding light-emitting pixels 03 through the switching elements K and the driving modules 02, and the number of select lines in the at least one select line group may be greater than or equal to 2 and less than or equal to 12. Setting the number of select lines to be greater than or equal to 2 can reduce the number of wirings in a bezel, meeting a narrow bezel demand of the display panel; and setting the number of select lines to be less than or equal to 12 can reduce the complexity of the demultiplexer circuit and improve the efficiency of data distribution. Specifically, the number of select lines in the select line group may be 2, 3, 4, 5, 6, 7, 8, 9, 10, 11, or 12.

During implementation, the light-emitting pixels 03 may include a first color light-emitting pixel, a second color light-emitting pixel, and a third color light-emitting pixel. Correspondingly, a number of select lines in the at least one select line group is N, N being a multiple of 3. A number of driving modules connected to the first color light-emitting pixel is N/3; a number of driving modules connected to the second color light-emitting pixel is N/3; and a number of driving modules connected to the third color light-emitting pixel is N/3.

The first color light-emitting pixel includes a blue light-emitting pixel; the second color light-emitting pixel includes a red light-emitting pixel; and the third color light-emitting pixel includes a green light-emitting pixel.

For example, if N is 9, the number of driving modules connected to the first color light-emitting pixel is 3, the number of driving modules connected to the second color light-emitting pixel is 3, and the number of driving modules connected to the third color light-emitting pixel is 3. Optionally, there may be 3 select line groups, and the number of select lines in each select line group is 3 as well, and the select lines in each select line group are respectively connected to the first color light-emitting pixel, the second color light-emitting pixel, and the third color light-emitting pixel through the corresponding switching elements.

Correspondingly, the select line group may include a first color select line, a second color select line, and a third color select line. Specifically, the first color select line is connected to the corresponding driving module and first color light-emitting pixel through the switching element; the second color select line is connected to the corresponding driving module and second color light-emitting pixel through the switching element; and the third color select line is connected to the corresponding driving module and third color light-emitting pixel through the switching element. Specifically, the first color select line, the second color select line, and the third color select line are arranged alternately in sequence. For example, when the select line group includes 6 select lines, the arrangement order may be the first color select line, the second color select line, the third color select line, the first color select line, the second color select line, and the third color select line.

In order to further reduce the power consumption, the duration of the first pulse received by each of the first color select line, the second color select line, and the third color select line cover all of the hold frames. As such, in one frame of image, the duration of the first pulse received by all of the select lines covers all of the hold frames, thereby greatly reducing the number of first pulses required by the demultiplexer circuit and reducing the power consumption of the display panel.

In some embodiments, voltage values of bias voltages received by the driving modules in the plurality of hold frames are the same and remain constant. Thus, there is no need to match the time for providing the bias voltages based on the different light-emitting pixels and the duration of the first pulses. This simplifies the timing solution while ensuring a certain effect of low-frequency flicker improvement, making the timing control easier to implement.

During implementation, the number of hold frames can be 59. Thus, one frame of image includes 1 data write frame and 59 hold frames. For a display panel with an original 60 Hz refresh rate, the refresh rate is automatically reduced to 1 Hz to achieve low frequency and low power consumption, while further reducing the power consumption of the display panel.

Alternatively, the number of hold frames may be 3. Thus, one frame of image includes 1 data write frame and 3 hold frames. For the display panel with the original 60 Hz refresh rate, the refresh rate is automatically reduced to 15 Hz. Alternatively, the number of hold frames may be 2. Thus, one frame of image includes 1 data write frame and 2 hold frames. For the display panel with the original 60 Hz refresh rate, the refresh rate is automatically reduced to 20 Hz. In this way, the low frequency and low power consumption is achieved, while further reducing the power consumption of the display panel.

In practical applications, the number of hold frames can be set based on the actual refresh rate adjustment requirements, and no specific limitation is made here.

Figure 11:
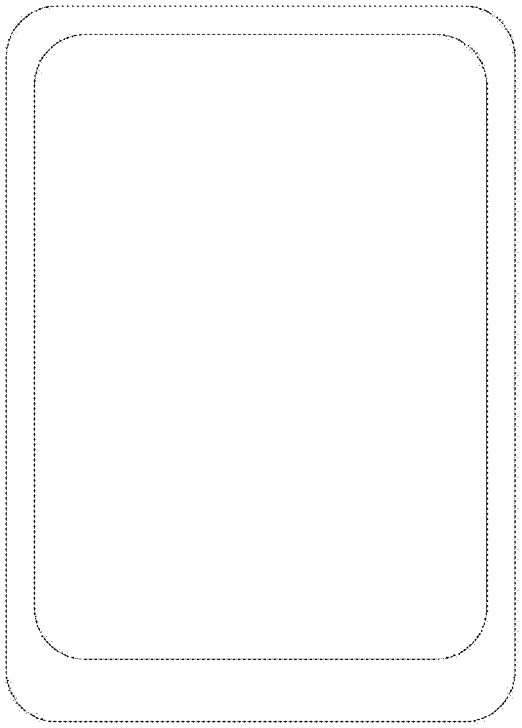
FIG. 11 is a schematic diagram of a structure of a display device according to an embodiment of the present application.

As an optional implementation of the disclosure of the present application, an implementation of the present application further provides a display device. The display device includes: the display panel according to any of the above embodiments. Referring to FIG. 11. FIG. 11 is a schematic diagram of a structure of a display device according to an embodiment of the present application. The display device may be a smart phone, a tablet computer, a digital camera, etc., which will not be described in detail here.

In this embodiment, the display device includes the display panel. During a plurality of hold frames of the display panel, in response to a first pulse, a bias voltage is provided to a plurality of driving modules to mitigate the problem of voltage bias, thereby ensuring the light-emitting effect of the display panel. At the same time, by adjusting the duration of the first pulse, the duration of at least one type of first pulse in the demultiplexer circuit is made to cover a plurality of hold frames, which can greatly reduce the number of first pulses received by the demultiplexer circuit in all of the hold frame phases, thereby reducing the number of clock signals and the power consumption of the display panel. In this way, the display device equipped with this display panel can effectively reduce the power consumption while maintaining the original display effect, thereby improving the cost-effectiveness of the product.

The various embodiments in the specification are described in a progressive manner, and each embodiment focuses on the differences from other embodiments. The same or similar parts between the various embodiments may be referenced to each other.

With respect to the above description of the disclosed embodiments, those skilled in the art could implement or use the present application. Various modifications to these embodiments are apparent to those skilled in the art, and the general principle defined herein may be practiced in other embodiments without departing from the spirit or scope of the present application. Therefore, the present application is not limited to the embodiments described herein but is to be accorded with the broadest scope consistent with the principle and novel features disclosed herein.

What is claimed is:

1. A display panel, comprising:

a demultiplexer circuit and a plurality of driving modules, wherein the demultiplexer circuit comprises at least one select line group and a plurality of switching elements, the at least one select line group comprising a plurality of select lines, and a plurality of select lines of the at least one select line group being respectively connected to corresponding the plurality of driving modules through the plurality of switching elements;

one frame of image of the display panel comprises a plurality of hold frames and a data write frame distinct from the plurality of hold frames;

the select line is configured to receive a first pulse in the plurality of hold frames, and during the duration of the first pulse, a switching element connected to the select line conducts to cause the corresponding driving module to receive a bias voltage; and the duration of the first pulse received by the at least one of the select line in the at least one select line group covers a plurality of the hold frames;

a plurality of light-emitting pixels, wherein the plurality of select lines of the at least one select line group are respectively connected to corresponding light-emitting pixels through the plurality of switching elements and the plurality of driving modules; and a first terminal of the switching element is connected to a DDIC data line, and a second terminal of the switching element is connected to a data write terminal of the driving module;

wherein the at least one select line group comprises a first type of select line and a second type of select line; and the first pulse comprises a first type of pulse and a second type of pulse;

the first type of select line receives at least the first type of pulse in the plurality of hold frames, and the second type of select line receives the second type of pulse in each of the plurality of hold frames;

the duration of the first type of pulse covers a plurality of the hold frames;

the duration of the second type of pulse is less than the duration of one of the hold frames;

the first type of select line further receives the second type of pulse in the plurality of hold frames; and the bias voltage comprises a first type of bias voltage and a second type of bias voltage, and a voltage value of the first type of bias voltage is different from a voltage value of the second type of bias voltage; and the plurality of select lines in the at least one select line group are further configured to receive a data write pulse in a time-division manner during the data write frame, and during the duration of the data write pulse, the plurality of switching elements connected to the plurality of select lines conduct to cause the corresponding plurality of driving modules to receive a data write voltage that is distinct from the bias voltage.

2. The display panel according to claim 1, wherein the duration of the first pulse received by all of the select lines in the at least one select line group covers a plurality of the hold frames.

3. The display panel according to claim 1, wherein the plurality of light-emitting pixels comprise a plurality of first color light-emitting pixels;

the second type of select line is connected to the corresponding first color light-emitting pixel through the switching element and the driving module; and during the duration of the second type of pulse, the switching element connected to the second type of select line conducts to cause the corresponding driving module to receive the first type of bias voltage.

4. The display panel according to claim 3, wherein the voltage value of the first type of bias voltage is less than the voltage value of the second type of bias voltage; and the plurality of first color light-emitting pixels comprise a plurality of blue light-emitting pixels;

or the voltage value of the first type of bias voltage is greater than the voltage value of the second type of bias voltage; and the plurality of first color light-emitting pixels comprise a plurality of green light-emitting pixels.

5. The display panel according to claim 1, wherein the bias voltage further comprises a third type of bias voltage; and the voltage value of the first type of bias voltage, the voltage value of the second type of bias voltage, and a voltage value of the third type of bias voltage are different from each other.

6. The display panel according to claim 5, wherein the plurality of light-emitting pixels comprise a plurality of first color light-emitting pixels, a plurality of second color light-emitting pixels, and a plurality of third color light-emitting pixels;

during the duration of the second type of pulse, the switching element connected to the second type of select line conducts to cause the driving module corresponding to the first color light-emitting pixel to receive the first type of bias voltage and the driving module corresponding to the second color light-emitting pixel to receive the second type of bias voltage; or cause the driving module corresponding to the first color light-emitting pixel to receive the first type of bias voltage and the driving module corresponding to the third color light-emitting pixel to receive the third type of bias voltage; or cause the driving module corresponding to the second color light-emitting pixel to receive the second type of bias voltage and the driving module corresponding to the third color light-emitting pixel to receive the third type of bias voltage.

7. The display panel according to claim 6, wherein the voltage value of the first type of bias voltage is less than the voltage value of the second type of bias voltage; the voltage value of the second type of bias voltage is less than the voltage value of the third type of bias voltage; the plurality of first color light-emitting pixels comprise a plurality of blue light-emitting pixels; the plurality of second color light-emitting pixels comprise a plurality of red light-emitting pixels; and the plurality of third color light-emitting pixels comprise a plurality of green light-emitting pixels.

8. The display panel according to claim 1, wherein a number of the plurality of select lines in the at least one select line group is greater than or equal to 2 and less than or equal to 12.

9. The display panel according to claim 8, wherein numbers of the plurality of select lines in all of the select line groups are the same.

10. The display panel according to claim 9, wherein a number of the plurality of select lines in the at least one select line group is N, N being a multiple of 3; and the plurality of light-emitting pixels comprise a plurality of first color light-emitting pixels, a plurality of second color light-emitting pixels, and a plurality of third color light-emitting pixels;

a number of the plurality of driving modules connected to the plurality of first color light-emitting pixels is N/3; a number of the plurality of driving modules connected to the plurality of second color light-emitting pixels is N/3; and a number of the plurality of driving modules connected to the plurality of third color light-emitting pixels is N/3.

11. The display panel according to claim 10, wherein the at least one select line group comprises a plurality of first color select lines, a plurality of second color select lines, and a plurality of third color select lines, wherein the first color select line is connected to the corresponding first color light-emitting pixel through the switching element and the driving module; the second color select line is connected to the corresponding second color light-emitting pixel through the switching element and the driving module; and the third color select line is connected to the corresponding third color light-emitting pixel through the switching element and the driving module.

12. The display panel according to claim 11, wherein the first color select line, the second color select line, and the third color select line are alternately arranged in sequence.

13. The display panel according to claim 1, wherein voltage values of bias voltages received by the plurality of driving modules in the plurality of hold frames are the same and remain constant.

14. The display panel according to claim 13, wherein the one frame of image of the display panel further comprises a data write frame; the plurality of select lines in the at least one select line group are configured to receive a second pulse in a time-division manner in the data write frame, and during the duration of the second pulse, the plurality of switching elements connected to the plurality of select lines conduct to cause the corresponding plurality of driving modules to receive a data write voltage.

15. The display panel according to claim 1, wherein the plurality of select lines in the at least one select line group receive the first pulse in a time-division manner in the plurality of hold frames.

16. A display device, comprising the display panel according to any one of claim 1.

17. A method of driving a display panel, the display panel comprising a demultiplexer circuit and a plurality of driving modules, wherein the demultiplexer circuit comprises at least one select line group and a plurality of switching elements, the at least one select line group comprising a first type of select line and a second type of select line, and a plurality of select lines of the at least one select line group being respectively connected to corresponding the plurality of driving modules through the plurality of switching elements, the method comprising:

driving the display panel through one frame of image that comprises a data write frame and a plurality of hold frames distinct from the data write frame;

during the data write frame, applying a data write pulse on each of the plurality of select lines in a time-division manner to cause the plurality of switching elements to conduct and to deliver a data write voltage to the plurality of driving modules;

during the plurality of hold frames, applying a first type of pulse on the first type of select line, wherein a duration of the first type of pulse covers a plurality of the hold frames, such that during the duration of the first type of pulse a switching element connected to the first type of select line conducts to deliver a first type of bias voltage to a corresponding driving module;

during each of the plurality of hold frames, applying a second type of pulse on the second type of select line, wherein a duration of the second type of pulse is less than a duration of one of the hold frames, such that during the duration of the second type of pulse a switching element connected to the second type of select line conducts to deliver a second type of bias voltage to a corresponding driving module, the second type of bias voltage having a voltage value different from a voltage value of the first type of bias voltage; and wherein the first type of bias voltage and the second type of bias voltage are delivered to the plurality of driving modules during the plurality of hold frames and are distinct from the data write voltage delivered to the plurality of driving modules during the data write frame.

18. The method according to claim 17, wherein the duration of the first type of pulse on the first type of select line covers a first portion of the plurality of hold frames, and during a remaining portion of the plurality of hold frames in which the first type of select line does not receive the first type of pulse, the second type of pulse is applied on the first type of select line, such that during the duration of the second type of pulse on the first type of select line, the switching element connected to the first type of select line conducts to deliver the second type of bias voltage to the corresponding driving module.

19. The method according to claim 17, wherein the plurality of driving modules drive a plurality of light-emitting pixels comprising at least light-emitting pixels of a first color and light-emitting pixels of a second color different from the first color, and wherein the first type of bias voltage corresponds to the first color and the second type of bias voltage corresponds to the second color.

* * * * *